United States Patent
Keppner et al.

(10) Patent No.: US 8,092,892 B2
(45) Date of Patent: Jan. 10, 2012

(54) METHOD FOR PRODUCING A PLASTIC MEMBRANE DEVICE AND THE THUS OBTAINED DEVICE

(75) Inventors: Herbert Keppner, Colombier (CH); Mustapha Benkhaïra, La Chaux-de-Fonds (CH)

(73) Assignee: Ecole d'Ingénieurs ARC, Le Locle (CH)

( * ) Notice: Subject to any disclaimer, the term of this patent is extended or adjusted under 35 U.S.C. 154(b) by 1111 days.

(21) Appl. No.: 11/721,772

(22) PCT Filed: Dec. 6, 2005

(86) PCT No.: PCT/EP2005/056499
§ 371 (c)(1), (2), (4) Date: Jun. 14, 2007

(87) PCT Pub. No.: WO2006/063955
PCT Pub. Date: Jun. 22, 2006

(65) Prior Publication Data
US 2009/0246546 A1    Oct. 1, 2009

(30) Foreign Application Priority Data
Dec. 16, 2004  (EP) .................................. 04405778

(51) Int. Cl.
| | |
|---|---|
| *B32B 1/04* | (2006.01) |
| *B32B 3/00* | (2006.01) |
| *B32B 27/00* | (2006.01) |
| *B05D 5/06* | (2006.01) |
| *C23C 16/00* | (2006.01) |

(52) U.S. Cl. .......... 428/68; 428/131; 428/161; 428/166; 428/500; 427/162; 427/255.7

(58) Field of Classification Search .............. 428/68, 428/131, 161, 166, 500; 427/162, 255.7
See application file for complete search history.

(56) References Cited

U.S. PATENT DOCUMENTS

| | | | |
|---|---|---|---|
| 4,834,512 A | 5/1989 | Austin | |
| 5,380,320 A | 1/1995 | Morris | |
| 5,944,976 A * | 8/1999 | Igel | ............................ 205/221 |
| 6,188,525 B1 | 2/2001 | Silver | |

FOREIGN PATENT DOCUMENTS

| | | |
|---|---|---|
| CH | 591090 | 9/1977 |
| GB | 571912 | 9/1945 |
| GB | 1551733 | 9/1979 |
| GB | 2184562 | 6/1987 |
| WO | 02/96389 | * 12/2002 |

OTHER PUBLICATIONS

International Search Report PCT/EP2005/0056499 related to subject applicatio.
European Search Report related to subject application.

* cited by examiner

*Primary Examiner* — Kevin R. Kruer
(74) *Attorney, Agent, or Firm* — Townsend M. Belser, Jr.; Nexsen Pruet, LLC

(57) ABSTRACT

A method for producing a membrane device by providing a substrate (24), adding a liquid (16) thereon, and covering the liquid (16) and at least one substrate portion bearing the liquid (16) with a homogenous continuous thin film (18) by means of a low-pressure deposition process. The film is made of a plastic material and forms a membrane.

23 Claims, 3 Drawing Sheets

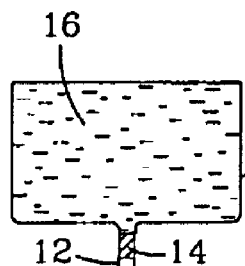
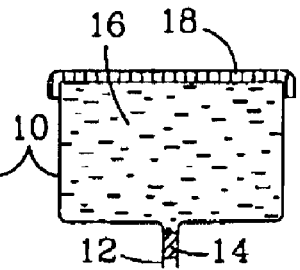
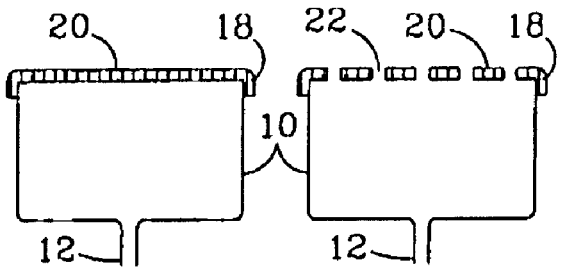
Fig.1a  Fig.1b  Fig.1c  Fig.1d
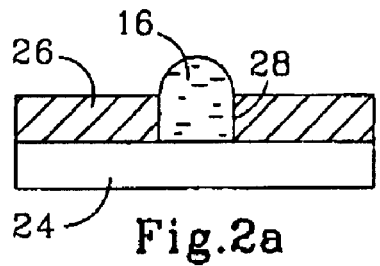
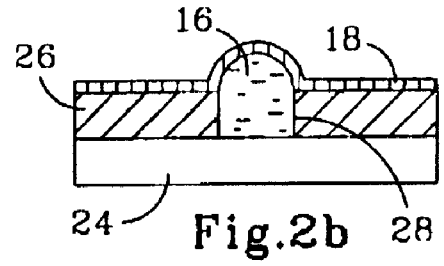
Fig.2a  Fig.2b
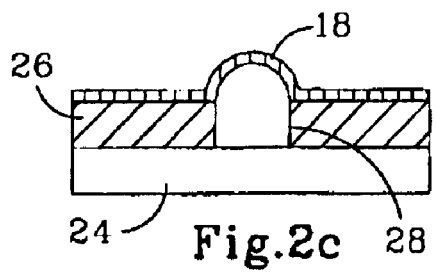
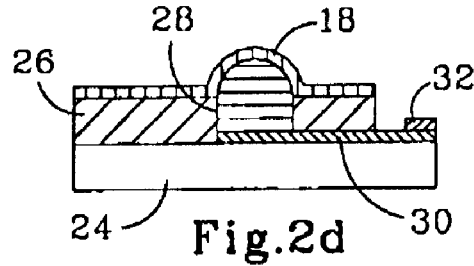
Fig.2c  Fig.2d
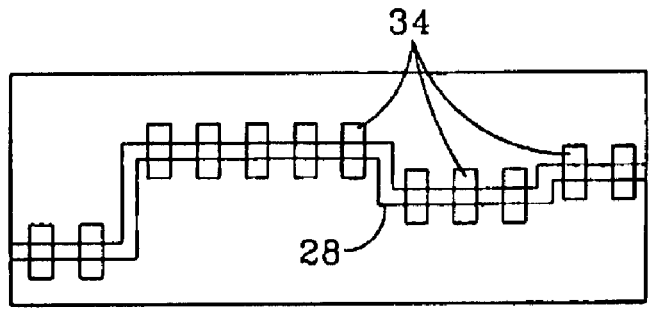
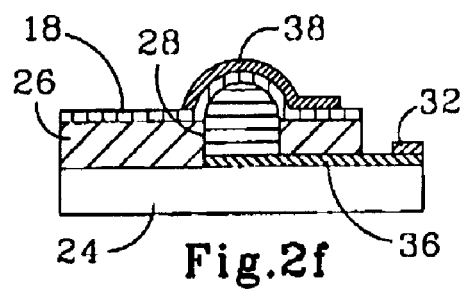
Fig.2e  Fig.2f

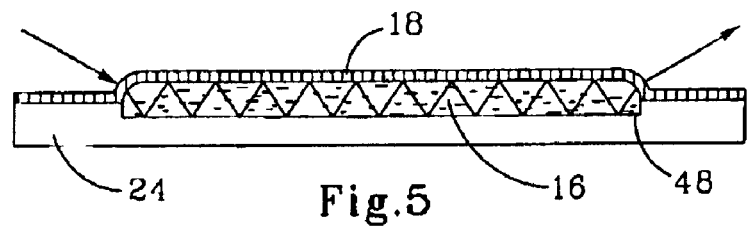
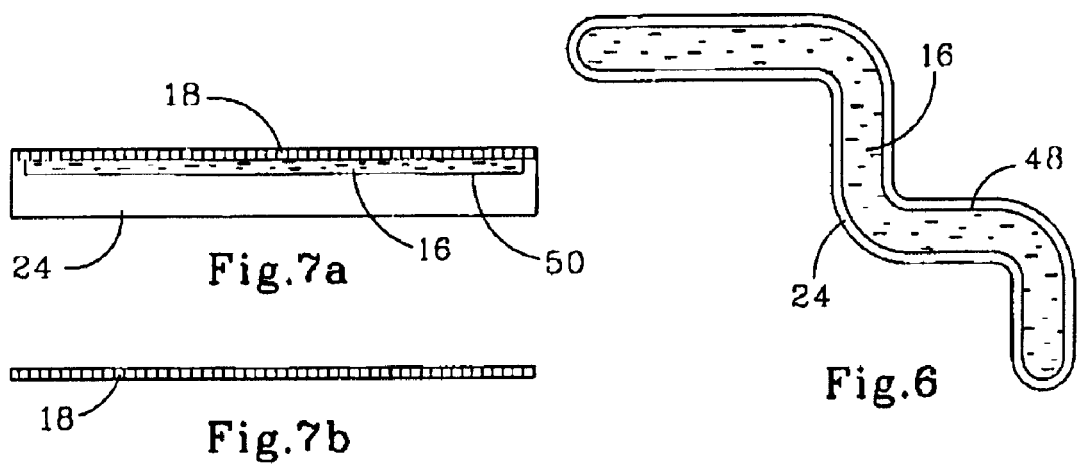
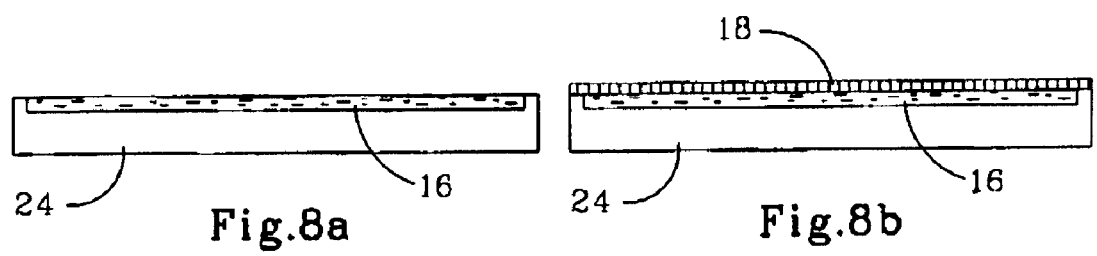

METHOD FOR PRODUCING A PLASTIC MEMBRANE DEVICE AND THE THUS OBTAINED DEVICE

This application is a U.S. National Stage entry under 35 U.S.C. 371 based on International Application No. PCT/EP2005/056499 filed Dec. 6, 2005, which was published under PCT Article 21(2) and which claims priority to European Application No. 04405778., filed Dec. 16, 2004.

BACKGROUND OF THE INVENTION

Field of the Invention

The present invention relates to the field of membrane devices. It relates more particularly to a method for producing plastic membrane micro-structures, as well as devices obtained by this method.

The invention is particularly, but not exclusively, interesting for applications in the microtechnic field, for example in manufacturing microlenses, microchannels, wave guides.

SUMMARY OF THE INVENTION

More precisely, the invention relates to a method for producing a membrane device, characterized in that it consists in:
  providing a substrate,
  adding a liquid thereon, and
  covering said liquid and at least one substrate portion bearing the liquid by a homogenous continuous thin film, which is made of a plastic material and forms a membrane, by means of a low-pressure deposition process.

The invention also relates to various embodiments of a device obtained by the above method in which the substrate forms, with the liquid and the membrane, either an optical lens, a wave guide, an actuator, or a fluid channel.

The invention lastly relates to a method for producing a membrane, characterized in that it consists in:
  providing a substrate,
  adding a liquid thereon,
  covering said liquid by a homogenous continuous thin film, which is made of a plastic material and forms a membrane, by means of a low-pressure deposition process, then
  detaching this membrane from the liquid.

Other characteristics will be shown more clearly upon reading the description which follows, provided in reference to the annexed drawings, in which FIGS. 1 through 8 present different membrane devices obtained thanks to the method according to the invention, as well as their embodiment.

As already mentioned, the invention relates, in substance, to the deposition of a thin film on a liquid and, possibly, on at least one neighboring portion of its substrate. This film is advantageously made up of a substance known for its coating properties, such as parylene.

The method of depositing the parylene, also called polyparaxylylene, is well known by those skilled in the art. Indeed, parylene is a polymer belonging to the plastics family, used as a coating for multiple applications in the electronic, medical, optical, spatial and micro-mechanic fields, among others. Deposited at low pressure (7 Pa) by pyrolyzing the diparaxylylene, it polymerizes at room temperature on all types of substrates, forming a uniform, homogenous, colorless layer perfectly fitting any excrescences and cavities, and having a thickness from approximately one hundred nanometers to sixty microns.

Parylene effectively protects various materials such as metal, textile, paper, glass, plastic and others from moisture, corrosion and etching with chemical products, acids and solvents. It forms an electrically insulating, thermally stable and biocompatible barrier. Its deposition may advantageously be done using equipment by the company Comelec (La Chaux-de-Fonds, CH).

Although widely spread in many industries, for various applications, parylene coating has, until now, been limited to solid materials.

The present invention opens a whole new field of investigation and offers new and original possibilities by extending parylene deposition to some liquid materials which meet specific conditions.

According to the invention, parylene deposition on the liquid-substrate combination is done under standard conditions. Pyrolysis of diparaxylylene is done at 680° C., the paraxylylene monomer polymerizing to the surface of the sample being kept at room temperature. The pressure in the deposition chamber being at 7 Pa, the saturation vapor pressure of the liquid must be less than this pressure, in order to avoid being vaporized during deposition. Ideally, the saturation vapor pressure of the liquid is less than or equal to one tenth of the deposit pressure, or 0.7 Pa. However, for some very specific applications, the saturation vapor pressure of the liquid must be in the vicinity of the deposit pressure, as explained later.

Moreover, the liquid used must be chemically non-reactive with parylene. Various oils, for example, have been successfully tested, including turbo-molecular pump oil, optical oils, silicone oils, glycerin, etc. . . . A non-exhaustive list of the different liquids able to be used for parylene deposition, as well as their properties, is provided in the following table. Of course, any other liquid meeting the aforementioned conditions may be used for parylene deposition.

|  | Chemical Formula | Vapor Pressure (Pa, 25° C.) | Appearance |
|---|---|---|---|
| Liquid | | | |
| But-2-ene-1,4-diol | $C_4H_8O_2$ | 0.63 | Pale, yellowish |
| Propanetriol triacetate | $C_9H_{14}O_6$ | 0.33 | Oily liquid |
| Tributyl Phosphate | $C_{12}H_{27}O_4P$ | 0.53 | Clear, colorless |
| Sulfuric acid | $H_2SO_4$ | $7.9 \times 10^{-3}$ | Oily, colorless |
| Organic acids | | | |
| Silicone oils | | Very low | transparent |
| Vacuum pump oil | | $<10^{-3}$ | transparent |
| Optical oils | | Very low | Various signs |
| Nonylphenol | $C_6H_{14}(OH)C_9H_{19}$ | 0.3 | Yellowish |
| 1,2 Diacetoxypropane | $CH_3-CO-CH_2-$ $CH(O-CO-CH_3)-$ $CH_3$ | Very low | Yellowish |
| Ionic liquids | | Very low | |
| Cyhalothrin | $C_{23}H_{19}ClF_3NO_3$ | $10^{-6}$ | Clear, viscous |

In the rest of the description, the word "liquid" designates any of the liquids listed above.

At the end of the method, a uniform and continuous film covers all of the liquid-substrate, thus forming an envelope fitting its contours perfectly. In particular, there is no discontinuity of the layer at the liquid-substrate interface, nor difference in quality of the layer between the portion deposited on the liquid and on the solid substrate. Of course, depending on what is needed, assuming appropriate masking, the film may be depositing only on the liquid and the portion of the substrate surrounding the liquid.

This ability of the parylene to deposit itself on a liquid, thereby forming a membrane, may be exploited for numerous applications. For some of these, the liquid is eliminated after deposition and, in this case, is called sacrificial. It may also be kept under the parylene membrane and constitute an integral part of the device thus realized.

In the continuation of this document, several examples of embodiments are described, without, however, constituting an exhaustive list of the possibilities related to the method according to the invention. All of the structures thus described may be realized on a flexible or rigid substrate. For a given type of substrate, spreading of the liquid and adhesion of the parylene on the substrate may be controlled and optimized either by plasma treatment, or by applying molecular layers, known as SAM (Self Assembly Monolayers).

BRIEF DESCRIPTION OF THE DRAWINGS

Other features of the invention will become apparent from the description that follows, given in conjunction with the appended drawings in which:

FIGS. 1a, 1b, 1c and 1d show a selective membrane and its method of production in four steps, with the help of a sacrificial liquid;

FIGS. 2a, 2b, 2c and 2d show in cross-section the manufacturing sequence of a fluid channel with the help of a sacrificial liquid, as well as two particularly advantageous variations of this;

FIG. 2e shows in a top view the use of the fluid channel of FIG. 2d in a peristaltic micropump;

FIG. 2f shows in cross-section another possibility for manufacturing a peristaltic micropump according to the invention;

FIG. 5 shows, in longitudinal cross-section, a wave guide manufactured using the method according to the invention;

FIG. 6 shows a hydraulic micro-actuator in a top view;

FIGS. 7a and 7b illustrate a method, according to the invention, for producing a thin self-supporting film; and, FIGS. 8a, 8b, 8c, 8d and 8e illustrate a method of producing a contact lens according to the invention.

DETAILED DESCRIPTION OF THE INVENTION

FIG. 1a

Figure 3A:
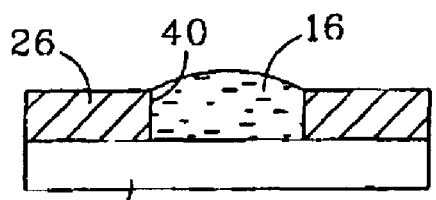
FIGS. 3a, 3b and 3c illustrate a method of producing micro-lenses according to the invention, as well as a particularly advantageous variation of this type of lens.
Figure 3B:
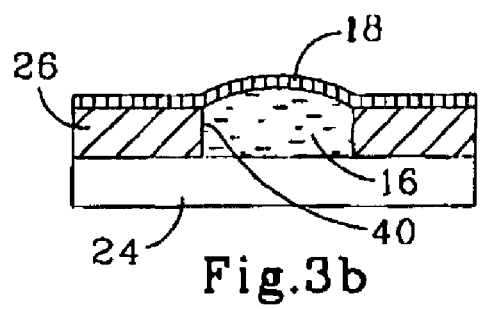
Figure 3C:
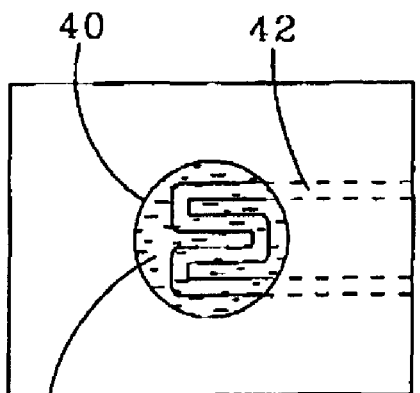
Figure 4A:
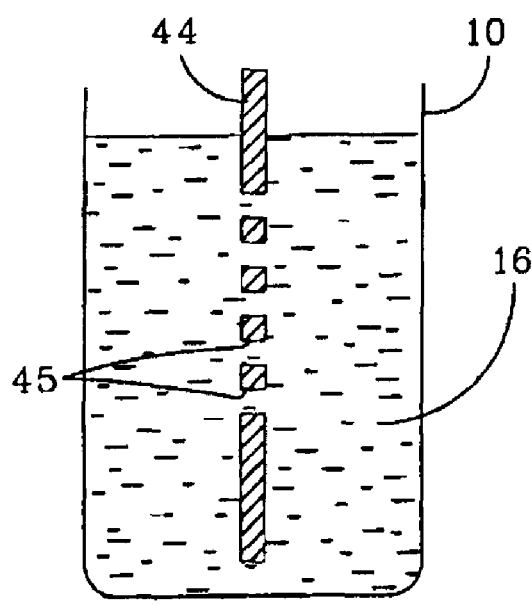
FIGS. 4a, 4b and 4c illustrate a simplified method for manufacturing a network of micro-lenses according to the invention.
Figure 4B:
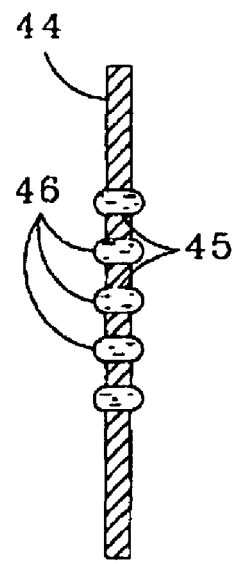
Figure 4C:
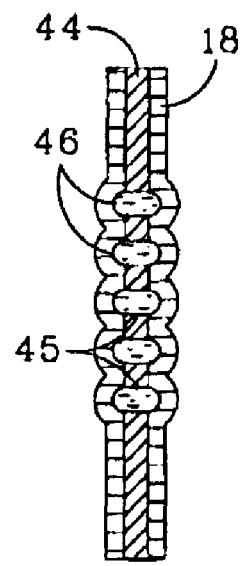

A container 10 having a diameter of approximately one hundred microns to several millimeters and comprising a lower discharge pipe 12 closed by a stopper 14, is filled with a 'liquid' 16.

FIG. 1b

The edge of the container 10 and the 'liquid' 16 are covered with a thin film 18 of parylene, which adheres only to the container.

FIG. 1c

The liquid 16 is discharged from the container 10 by removing the stopper 14. The thin film 18 remains in place, thus forming a film 20 stretched between the walls of the container 10.

FIG. 1d

The film 20 is pierced with micro-holes 22 by laser ablation in order to constitute a selective membrane. It may also be made porous by controlled physico-chemical etching of the "Reactive Ion Etching" (RIE) test. The device thus realized forms a filter for gas or other fluid, simple to manufacture and inexpensive.

FIG. 2a

A substrate, made up of a plate 24 covered with a layer 26 of a material able to be structured, is shown in cross-section. One example of material that may be used for the layer 26 is the photosensitive resin or "blue tape" commonly used to cut silicon chips. A channel 28, opened in the layer 26 by an etching procedure available to one skilled in the art, is filled with a 'liquid' 16. This liquid and the material making up the layer 26 are chosen, moreover, such that the contact angle between the 'liquid' and the material is greater than or equal to 20 degrees. If the 'liquid' 16 is, for example, oil, the layer 26 is made up of an oleophobic material, meaning which repels oil. In this way, the 'liquid' 16 minimizes its contact surface with the material making up the layer 26, and its surface, when it is in the channel 28, is convex. This property is also useful to evacuate the 'liquid' 16 from the channel 28, as described in the following.

FIG. 2b

A thin film 18 of parylene is deposited on the entire substrate-'liquid' 16, thereby closing the channel 28 containing the 'liquid' 16.

FIG. 2c

The 'liquid' 16 is discharged from the channel 28 through an opening located in one of its ends. The device thus realized, by an extremely simple method, is a fluid channel 28 closed by a parylene membrane. This channel 28 may be used to transport any fluid compatible with the materials used.

FIG. 2d

The illustrated device is different from the device shown in FIG. 2c by the addition of a layer 30 of a piezoelectric material at the bottom of the channel 28, deposited and structured before deposition of the layer 26. This layer 30 is, moreover, made accessible during structuring of the layer 26, so as to connect it to an electrode 32. An electric impulse transmitted by this electrode 32 is transformed, thanks to the properties of the material, into a physical impulse causing a shock wave within the fluid transported by the channel 28.

FIG. 2e

The fluid channel 28, shown in a top view in this figure, is equipped with a layer of a piezoelectric material structured in a plurality of rectangular elements 34 distributed along said channel. Each of the elements 34 creates, locally, a shock wave in the transported fluid, the slightly unsynchronized action of each element with regard to its neighbor enabling propagation of the fluid in the channel 28. A peristaltic micropump is thus manufactured.

FIG. 2f

Another possibility for manufacturing a peristaltic micropump consists of depositing, instead and in place of the piezoelectric layer 30, a conductive layer 36, transparent if possible, for example in ITO (Indium Tin Oxide) and structuring it in rectangular elements 34, as before. A second conductive layer 38 is deposited on the parylene membrane and structured in rectangular elements 34 aligned with the first. A difference of potential applied between each pair of elements 34 causes a local deformation of the parylene film 18 acting as a contraction of the channel 28. Propagation of this contraction enables transport of the fluid present in the channel 28.

FIG. 3a

As for the production of a fluid channel, a substrate made up of a plate 24 covering a layer 26 of a material able to be structured, such as a photosensitive resin or "blue tape", is shown in cross-section. A circular hole 40, having a diameter of between one micron and several millimeters, is opened in the layer 26, then filled with a 'liquid' 16. The convexity of the drop of 'liquid' thus formed depends entirely on the surface tension of the 'liquid' 16 and the free energy of the surface of the layer 26. Thus, the geometry of the drop of 'liquid' 16 is, on one hand, perfectly reproducible for a same material making up the layer 26 and a same 'liquid' 16, and, on the other hand, adaptable according to the needs of the lens to be produced.

FIG. 3b

A thin film 18 of parylene is deposited on the substrate-'liquid' 16 assembly, thus closing the circular hole 40 containing the 'liquid' 16. The 'liquid' 16 is, this time, captured by the parylene membrane, and the substrate-liquid-parylene assembly forms a lens having a focal distance determined by the materials used.

FIG. 3c

In a particularly interesting variation of the micro-lens, a resistive heater 42, made up of a track of a transparent conductive material, is lodged under the 'liquid' 16. This track is produced by depositing and structuring a layer of a transparent conductive material, this deposition preceding that of the layer 26. When the resistive heater 42 produces an increase in the temperature of the 'liquid' 16, this expands, thereby modifying the geometry of the lens and its optic properties. A variable focus lens is thus realized.

FIG. 4a

A substrate 44, which may be rigid or flexible and which comprises a plurality of circular holes 45 going through it, is soaked in a 'liquid' 16 contained by a container 10. The substrate 44 and the 'liquid' 16 are chosen, on one hand, according to the selection criteria for the 'liquid' 16 already cited and, on the other hand, such that the surface of the substrate 44 strongly repels the 'liquid' 16. If the 'liquid' 16 is an oil, the material used for the substrate 44 must be strongly oleophobic. 'Blue tape' combined with oil is a material compatible with this application.

FIG. 4b

When the substrate 44 is removed from the container 10, drops 46 are captured by the circular holes 45, whereas the remaining surface of the substrate is free of 'liquid' 16, due to the properties of the chosen materials. The convexity of the lenses is significant due to the principle of the method itself, but it may be adapted depending on what is needed.

FIG. 4c

A thin film 18 of parylene is deposited on both surfaces of the substrate 44, thereby enclosing the drops 46 held in the holes 45 of the substrate 44. The substrate 44—drops 46—parylene membrane assembly then forms a network of micro-lenses manufactured using a simple and inexpensive technique.

FIG. 5

A channel 48 etched in the substrate 24 is filled with a 'liquid' 16. The material forming the substrate 24 and the 'liquid' 16 are chosen such that the contact angle between the 'liquid' and the substrate is sufficiently large. In this way, the surface of the 'liquid' 16 on the edge of the channel 48 is convex. Moreover, the index of the materials and optical qualities of the 'liquid' 16 must be taken into account.

The substrate 24 and the 'liquid' 16 are covered with a thin film 18 of parylene keeping the 'liquid' 16 in its housing. The wave guide thus formed is particularly advantageous since it allows easier coupling of the light entering and exiting the wave guide, without the intermediary of a diffraction network, due to the curvature of the 'liquid' 16 on the edge of the channel 48.

FIG. 6

The device shown in a top view in FIG. 6 is a hydraulic micro-actuator. It is made up of a substrate 24, flexible or rigid, long relative to its width, and in which is etched a channel 48, filled with a 'liquid' 16 verifying the conditions for compatibility with parylene deposition. A thin film of parylene covers the whole, such that the 'liquid' 16 is enclosed in its housing. The device thus produced uses the property of incompressibility of the 'liquid' 16 to generate a controlled micro-jog of the 'liquid' 16 and the parylene film. Indeed, pressure exerted on the parylene membrane covering the 'liquid' 16, in one of the ends of the device, results in a slight movement of the 'liquid' 16 and of the parylene membrane in another point of said device. This actuator presents the advantage of being entirely hydraulic and adaptable to microscopic movements.

FIG. 7a

The entire surface of a substrate 24 is covered with a 'liquid' 16, thanks to a cavity 50. A thin film 18 of parylene is deposited on the assembly, perfectly fitting the excrescences of the substrate 24 and the flatness of the 'liquid' 16.

FIG. 7b

The thin film 18 is separated from the substrate 24 and from the 'liquid' 16, for example by cutting the thin film 18 at the boundary between the substrate 24 and the liquid 16. One will note that the thin film 18 is separated from the 'liquid' 16 without any difficulty, since it does not adhere to it. Its lower surface, previously in contact with the 'liquid' 16, presents a surface morphology comparable to that of the 'liquid' 16. This type of extremely flat surface may be used, for example, as a reference for an atomic force microscope.

This ability of the parylene film 18 to easily detach itself from a 'liquid' 16 by peeling may also be used to form a self-supporting film. It is sufficient to roll the thin film 18 thus constituted around itself like a ribbon of adhesive paper, then use it to envelope any object. To this end, a particularly advantageous embodiment consists of depositing the parylene on a substrate 24 having a spiral shape and coated with the 'liquid' 16. The parylene film 18 deposited on the two sides may be detached without difficulty and form a ribbon ready to be rolled.

This type of self-supporting film may also be realized such that the properties of the two surfaces are different. Indeed, using a 'liquid' 16 having a saturation vapor pressure close to the deposit pressure makes it possible to modify the beginning of growth of the parylene film 18. A reaction of the molecules making up the 'liquid' 16, present in the gaseous phase next to the 'liquid' 16, with the paraxylylene monomer causes this change of the initial growth phase of the film. Depending on the choice of 'liquid' 16, this initial layer may have mechanical, electrical or other properties, different from the 'pure' parylene film.

FIG. 8a

A substrate 24 is covered with 'liquid' 16.

FIG. 8b

A first deposition of parylene forms a thin film 18 on the 'liquid' 16.

FIG. 8c

A drop of 'liquid' 16 is deposited on the thin film 18. The 'liquid' 16 is chosen according to its optical and mechanical properties. Its surface tension must be such that the drop forms a specific angle with the parylene film 18.

FIG. 8d

A second layer of parylene 52 is deposited on the assembly, sealing the drop of 'liquid' 16 between the first parylene film 18 and the second 52.

FIG. 8e

The thin film 18 is separated from the 'liquid' 16 on which it was resting, the entire parylene membrane—drop 16—parylene membrane forming a contact lens having an extremely simple design.

This method of encapsulating a 'liquid' 16 between two parylene membranes 18 and 52 may give rise to various applications. In the medical field, for example, capsules containing a medication may be manufactured in this way. Parylene not being able to be broken down by the human body, a system for opening the capsule is necessary to deliver the active ingredient.

The above description was provided in reference to a deposition of parylene. Of course, any other substance having similar properties may be used.

One will note, lastly, that the use of a cavity, such as a circular hole 40 or a channel 28, to guide the liquid 16, is not crucial to the realization of the devices described. A technique of depositing material by direct writing, such as inkjet printing or local dispensing, may be used in order to form the 'liquid' structures intended to be covered by a parylene film 18. In this case, the 'liquid' 16 must be strongly repelled by the substrate 24 so as not to spread on it. Another possibility is to use a substrate which strongly repels the liquid to be deposited, and to apply locally, by embossed printing or inkjet printing, an "acceptance" layer. This layer is made up of a material capable of strongly retaining the 'liquid'. It is then sufficient to soak the substrate in the 'liquid' 16. Only the zones covered with the acceptance layer will be covered by the 'liquid' in the end.

What is claimed is:

1. A membrane device in the form of an optical lens comprising a substrate, a liquid deposited on said substrate, and a first homogenous continuous thin film covering said liquid and at least one substrate portion bearing said liquid, wherein said liquid and substrate portion are covered by said film by means of a low-pressure deposition process, said film being made of polyparaxylylene or parylene and forming a membrane fitting the contours of the substrate-liquid assembly, and wherein said liquid has a saturation vapor pressure lower than the deposit pressure and is chemically non-reactive with said polyparaxylylene or parylene, said optical lens having a focal distance determined by materials which are used.

2. The membrane device according to claim 1, wherein said liquid has a surface tension chosen in such a way that the liquid forms a specific angle with the substrate.

3. The membrane device according to claim 1, wherein it further comprises a heater lodged under said liquid for producing an increase in the temperature of the liquid, which expands for modifying the geometry of the lens.

4. The membrane device according to claim 1, wherein said substrate comprises a cavity in which said liquid is deposited.

5. The membrane device according to claim 4, wherein said cavity passes through said substrate from one surface to another surface, and wherein said film is deposited on both of said surfaces of the substrate.

6. The membrane device according to claim 1, wherein said substrate is made of a second homogenous continuous thin film made of polyparaxylylene or parylene deposited by means of a low-pressure deposition process.

7. The membrane device according to claim 1, wherein said liquid is an oil.

8. The membrane device according to claim 1, wherein said substrate comprises an oleophobic material.

9. A method for producing a membrane device in the form of an optical lens according to claim 1, said method comprising:
providing a substrate,
depositing a liquid on said substrate, and
covering said liquid and at least one substrate portion bearing said liquid with a first homogenous continuous thin film by means of a low-pressure deposition process,
said film being made of polyparaxylylene or parylene and forming a membrane fitting the contours of the substrate-liquid assembly,
said liquid having a saturation vapor pressure lower than the deposit pressure and being chemically non-reactive with said polyparaxylylene or parylene,
and said optical lens having a focal distance determined by materials which are used.

10. The method according to claim 9, wherein said liquid has a surface tension chosen in such a way that the liquid forms a specific angle with the substrate.

11. The method according to claim 9, wherein said substrate comprises a cavity in which said liquid is deposited.

12. The method according to claim 1, wherein said cavity passes through said substrate from one surface to another surface, and wherein said film is deposited on both of said surfaces of the substrate.

13. The method according to claim 9, wherein said substrate is made of a second homogenous continuous thin film made of polyparaxylylene or parylene deposited by means of a low-pressure deposition process.

14. The method according to claim 9, wherein said liquid is an oil.

15. The method according to claim 9, wherein said substrate comprises an oleophobic material.

16. A membrane device in the form of a piezoelectric actuator comprising a substrate, a liquid deposited in a channel of said substrate, and a layer of a piezoelectric material deposited at the bottom of said channel and made accessible so as to connect it to an electrode, wherein a homogenous continuous thin film covers said liquid and at least one substrate portion bearing said liquid, wherein said film is of a polyparaxylylene or parylene made by means of a low-pressure deposition process and forms a membrane fitting the contours of the substrate-liquid assembly, and wherein said liquid has a saturation vapor pressure lower than the deposit pressure and is chemically non-reactive with said polyparaxylylene or parylene.

17. The membrane device according to claim 16, wherein said liquid is an oil.

18. The membrane device according to claim 16, wherein said substrate comprises an oleophobic material.

19. The membrane device according to claim 16, wherein the layer of piezoelectric material is structured in a plurality of elements distributed along said channel to create locally a shock wave in the liquid, and wherein a slightly unsynchronized action of each element with regard to its neighbor enables propagation of the liquid in the channel.

20. A method for producing a membrane device in the form of a piezoelectric actuator according to claim 16, said method comprising:
providing a substrate comprising a channel and a layer of a piezoelectric material deposited at the bottom of said channel and made accessible so as to connect it to an electrode,
depositing a liquid in said channel of said substrate, and covering said liquid and at least one substrate portion bearing said liquid with a homogenous continuous thin film by means of a low-pressure deposition process, said film being made of polyparaxylylene or parylene and forming a membrane fitting the contours of the substrate-liquid assembly, and said liquid having a saturation vapor pressure lower than the deposit pressure and being chemically non-reactive with said polyparaxylylene or parylene.

21. The method according to claim 20, wherein said liquid is an oil.

22. The method according to claim 20, wherein said substrate comprises an oleophobic material.

23. The method according to claim 20, wherein the layer of piezoelectric material is structured in a plurality of elements distributed along said channel to create locally a shock wave in the liquid, and wherein a slightly unsynchronized action of each element with regard to its neighbor enables propagation of the liquid in the channel.

* * * * *